United States Patent
Gousset-Rousseau

(10) Patent No.: US 10,161,587 B2
(45) Date of Patent: Dec. 25, 2018

(54) LIGHTING MODULE AND DEVICE WITH REDUCED SIZE FOR AUTOMOBILE VEHICLES

(71) Applicant: VALEO VISION, Bobigny (FR)

(72) Inventor: Simon Gousset-Rousseau, Vincennes (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/439,196

(22) Filed: Feb. 22, 2017

(65) Prior Publication Data

US 2017/0241608 A1     Aug. 24, 2017

(30) Foreign Application Priority Data

Feb. 23, 2016  (FR) .................................... 16 51459

(51) Int. Cl.
*B60Q 1/16*       (2006.01)
*F21S 41/19*      (2018.01)
(Continued)

(52) U.S. Cl.
CPC .............. *F21S 41/265* (2018.01); *B60Q 1/16* (2013.01); *F21S 41/141* (2018.01);
(Continued)

(58) Field of Classification Search
CPC .. F21S 48/1275; F21S 48/115; F21S 48/1159; F21S 48/1329; F21S 48/1388; B60Q 1/16; F21V 7/0091
See application file for complete search history.

(56) References Cited

U.S. PATENT DOCUMENTS

| | | | |
|---|---|---|---|
| 5,813,743 A * | 9/1998 | Naka ................... | F21S 48/1329 362/16 |
| 2010/0135036 A1* | 6/2010 | Matsuba .............. | F21S 48/1154 362/516 |

(Continued)

FOREIGN PATENT DOCUMENTS

| | | |
|---|---|---|
| DE | 10 2007 052 696 A1 | 7/2008 |
| DE | 10 2011 013 211 A1 | 9/2012 |

(Continued)

OTHER PUBLICATIONS

French Preliminary Search Report dated Jul. 26, 2016 in French Patent Application No. FR 1651459 (with English translation of categories of cited documents).

*Primary Examiner* — Alexander K Garlen
(74) *Attorney, Agent, or Firm* — Oblon, McClelland, Maier & Neustadt, L.L.P.

(57) ABSTRACT

Module for emitting at least one light beam along an optical axis for automobile vehicles. The module includes at least a first and at least a second light sources, at least a first and at least a second optical collectors designed to collect the light emitted by the at least a first and the at least a second light sources, respectively, and for redirecting the light collected in convergent directions. At least one of the at least a first and the at least a second light sources is oriented in such a manner as to emit light in an overall direction of emission moving away from the optical axis. The collector associated with the or with said oriented light sources have at least partially an asymmetrical configuration elongating the collector along the optical axis.

27 Claims, 1 Drawing Sheet

(51) Int. Cl.
　　　*F21S 41/32*　　　(2018.01)
　　　*F21S 41/36*　　　(2018.01)
　　　*F21S 43/14*　　　(2018.01)
　　　*F21S 43/19*　　　(2018.01)
　　　*F21S 41/141*　　(2018.01)
　　　*F21S 41/147*　　(2018.01)
　　　*F21S 41/265*　　(2018.01)
　　　*F21S 41/663*　　(2018.01)

(52) U.S. Cl.
　　　CPC ............. *F21S 41/147* (2018.01); *F21S 41/19* (2018.01); *F21S 41/192* (2018.01); *F21S 41/198* (2018.01); *F21S 41/32* (2018.01); *F21S 41/322* (2018.01); *F21S 41/36* (2018.01); *F21S 43/14* (2018.01); *F21S 43/19* (2018.01); *F21S 43/195* (2018.01); *F21S 41/663* (2018.01)

(56) References Cited

U.S. PATENT DOCUMENTS

| | | | | |
|---|---|---|---|---|
| 2013/0322105 | A1* | 12/2013 | Uchida | B60Q 1/16 362/517 |
| 2014/0016343 | A1 | 1/2014 | Brendle | |
| 2014/0321143 | A1* | 10/2014 | Hossfeld | F21S 48/137 362/516 |

FOREIGN PATENT DOCUMENTS

| | | |
|---|---|---|
| DE | 10 2014 205 994 A1 | 10/2015 |
| WO | WO 2011/154470 A1 | 12/2011 |

\* cited by examiner

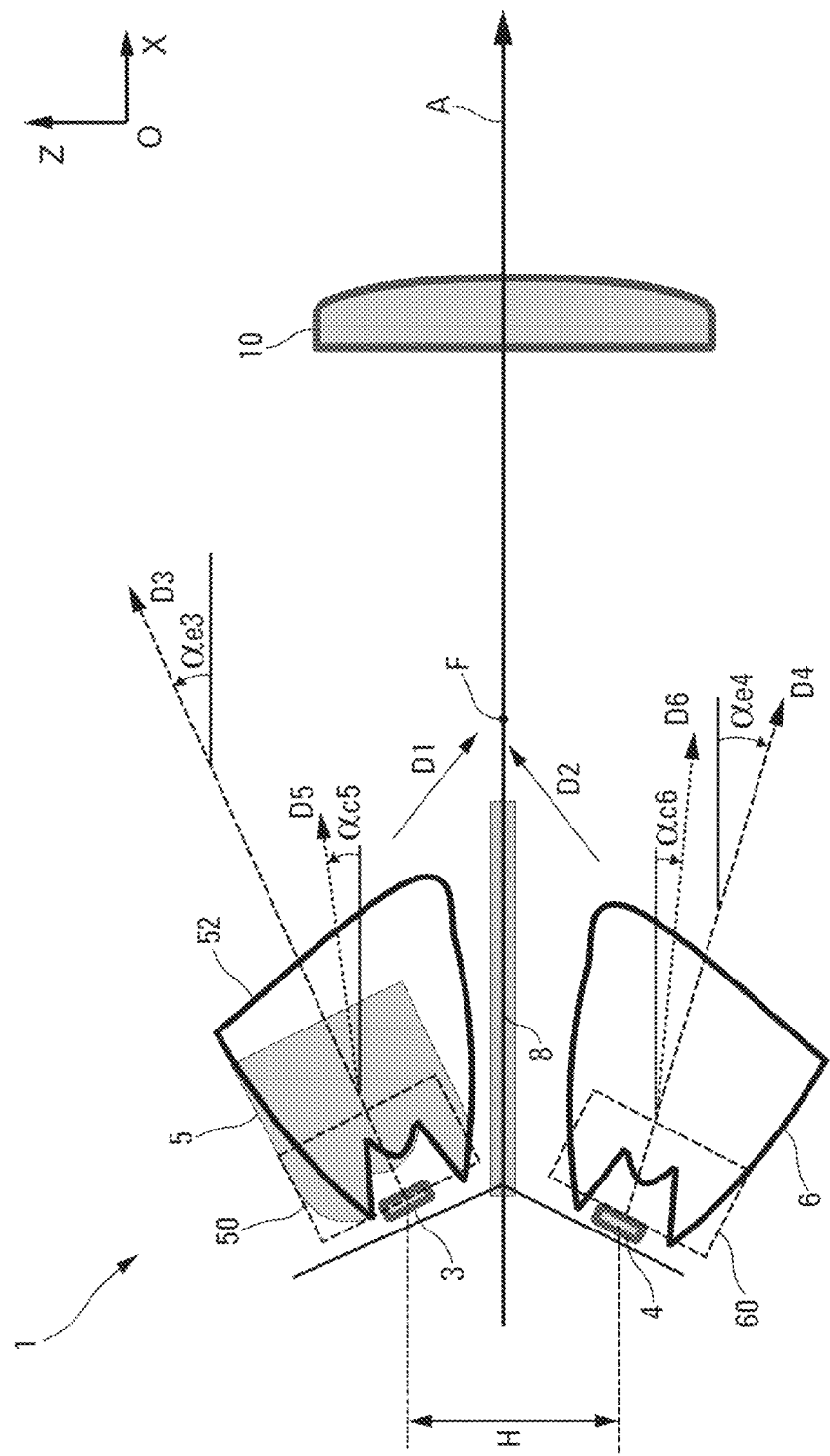

LIGHTING MODULE AND DEVICE WITH REDUCED SIZE FOR AUTOMOBILE VEHICLES

BACKGROUND OF THE INVENTION

The present invention relates to a module and a device for emitting a light beam and to an associated headlamp. One preferred application of the invention relates to the automobile industry for the production of lighting devices, notably of vehicle headlamps.

Modules are known for emitting a light beam with a cut-off profile, notably for automobile vehicles. In particular, modules are known comprising two optical collectors designed to collect the light emitted by light sources and to redirect the light collected toward a focal region where a cut-off element is situated configured for generating the cut-off profile of the light beam to be projected by means of a lens.

In the modules known to those skilled in the art, the light sources and associated collectors are oriented in the direction of the cut-off element aligned in the optical axis of the device, as described in the French patent document FR2934667.

Such a configuration has the drawback of not allowing any improvement in the compactness of the whole of the device. This is because the size of the collectors and the presence of the cut-off element between the two collectors limit how close the optical sources can be brought together. If they are brought closer than a certain distance, the end of the collectors oriented in the direction of the cut-off element collides with the cut-off element.

This is particularly a drawback for the design of small aperture systems with the use of a thin lens in which the collimator must be brought as close as possible to the plane comprising the cut-off element.

Several size constraints associated with the collector also limit the possibility of making the existing lighting systems for automobile vehicles more compact.

Firstly, the collector must have sufficiently large dimensions in order to collect a maximum amount of light coming from the light source.

Secondly, the collection area of the collector designed to redirect the light toward a focal region must be larger than the dimensions of the surface of the light source in order to allow a correct focusing in the focal region.

Thirdly, the entry surface of the collector must be sufficiently far from the light source owing to the thermal constraints.

SUBJECT AND SUMMARY OF THE INVENTION

The present invention allows the drawbacks of the known devices of the prior art to be overcome by taking into account the aforementioned constraints, according to one ingenious approach which, in contrast to the conventional solutions, consists in orienting at least one of the light sources, and the collector associated with this source, in a direction moving away from the optical axis of the device and, in particular, away from the cut-off element, rather than in a direction pointing towards this element. In view of the unusual orientation of the source and of the associated collector, the latter is designed in such a manner that it re-directs the rays coming from the light source toward a focal region.

Thus, the present invention is aimed at a module for emitting a light beam along an optical axis, notably for automobile vehicles. This device comprises at least a first and at least a second light sources, together with at least a first and at least a second optical collectors designed to collect the light emitted by said at least a first and at least a second light sources, respectively, and to redirect the light collected in convergent directions. Advantageously, the beam is a beam with a cut-off profile.

According to the principle of the invention, at least one of said at least a first and said at least a second light sources is oriented in such a manner as to emit light in an overall direction of emission moving away from the optical axis, and the collector associated with said oriented light source or sources exhibits, at least partially, an asymmetrical configuration elongating the collector along the optical axis. The overall direction of emission of the light sources forms an angle of emission $\alpha_e$ with the optical axis in the range between 5° and 15°.

In this way, the invention allows the two light sources to be brought closer together and, consequently, the size of the device to be reduced in its vertical dimension (in other words in a direction perpendicular to its optical axis).

Other features, that are optional and non-limiting, are presented hereinafter, it being noted that they may be implemented separately or according to any of their mutual combinations.

Said at least a first and at least a second collectors are adapted for redirecting the light onto at least one focal region.

Said at least a first and at least a second collectors are adapted for redirecting the light onto the same focal region.

The collector and/or collectors comprise a collection portion oriented in the overall direction of emission of the associated light source, in such a manner as to collect and to collimate the light coming from the light source.

The collector and/or collectors are designed to collimate light rays coming from the light source in a direction forming a non-zero collimation angle $\alpha_c$ with respect to the optical axis.

Said at least a first and/or at least a second collectors comprise an exit surface forming an optical interface, the surface being configured for focusing the collimated light toward the focal region.

The exit surface is inclined in a direction of inclination forming an angle of inclination $\alpha_s$ with the optical axis of the collector in the range between 5° and 20°.

The module furthermore comprises a cut-off element, configured for giving a cut-off profile to the beam.

The cut-off element is reflecting.

The cut-off element is disposed along the optical axis between said at least a first and at least a second collectors.

Said at least a first light source and said at least a first collector are designed to supply a first beam with a cut-off profile for an illumination of the low-beam type.

Said at least a second light source and said at least a second collector are intended to complete the first beam in such a manner as to obtain a second beam for an illumination of the high-beam type.

At least one of said at least a first and at least a second light sources comprises a light-emitting diode.

The sources of light and the collectors are disposed symmetrically with respect to the optical axis.

The module comprises a plurality of first and second light sources and a plurality of first and second collectors respectively associated with the first and second light sources, and in which the first collectors are formed as a single element and/or the second collectors are formed as a single element with one other, respectively.

The module furthermore comprises a projection lens which could be configured so as to be common to the plurality of first and second collectors.

Another aspect of the embodiments of the invention relates to an emission device intended for a lighting system for an automobile vehicle, the emission device comprising at least one emission module according to the invention according to one or more of the features described hereinbefore. According to one particular embodiment of the invention, the device is a front headlamp of an automobile vehicle.

Another subject of the invention is an automobile vehicle equipped with at least one emission device according to the invention, said device comprising at least one emission module, such as described hereinabove.

BRIEF DESCRIPTION OF THE DRAWING

Other features, details and advantages of the invention will become apparent upon reading the description presented with reference to the appended drawing, given by way of example, and which shows schematically in FIG. 1 a lighting module for automobile vehicles according to one particular embodiment of the invention.

The term "parallel" or the notion of axes coinciding is to be understood here notably with the manufacturing or installation tolerances: substantially parallel directions or substantially coincident axes are examples of this.

DETAILED DESCRIPTION OF ONE EMBODIMENT

FIG. 1 is a cross-sectional representation of a lighting module or module for emitting at least one light beam for automobile vehicles according to one particular embodiment of the invention. In this representation, the cross-section is taken across a vertical plane (O, X, Z) of a local orthonormal reference frame {O, X, Y, Z} where the axis O-X indicates a horizontal direction, parallel to the optical axis A of the module, whereas the axis O-Z denotes a vertical direction perpendicular to the axis O-X.

The emission module illustrated in FIG. 1 is designed to produce two light beams for the implementation of two separate lighting modes: (i) an illumination exhibiting a cut-off profile in order to avoid dazzling the oncoming vehicles (corresponding to a lighting mode of "low-beam" type), and (ii) an illumination without cut-off profile (corresponding to a lighting mode of the "high-beam" or "full-beam" type).

The emission module 1 comprises a first assembly composed of a first light source 3 and of a first optical collector 5, the first optical assembly being designed to supply a first light beam.

The emission module 1 furthermore comprises a second assembly composed of a second light source 4 and of a second optical collector 6, the second optical assembly being designed to supply a second light beam.

A converging lens 10 is disposed along the optical axis A, in such a manner as to project the optical beams coming from the collectors and to implement one of the two lighting modes provided depending on the illumination of one or of both light sources 3, 4.

A cut-off element 8 is disposed between the first and second assemblies, along the optical axis A of the headlamp, in order to form the desired cut-off profile.

The cut-off profiles produced by the cut-off element 8 can have any spatial orientation. The cut-off profile preferably arises from the formation of an exit beam non-uniformly distributed around the optical axis owing to the presence of a region of reduced light exposure, this region being substantially bounded by a cut-off profile which may be composed of at least two, and notably three, straight segments forming an angle between them or may have a more complex shape with curves such as the cut-off profiles known by the term "kink". The resulting illumination is said to be of the "low-beam headlamp" type.

The cut-off element 8 is reflecting. It is composed, for example, of a metal plate known as a "folder".

In other words, the first light source 3 and the first collector 5 are designed to supply a first beam with a cut-off profile for an illumination of the low-beam type, whereas the second light source 4 and the second collector 6 are intended to complete the first beam so as to obtain a second beam in order to produce an illumination of the high-beam type.

In the present example, each light source 3, 4 is composed of a light-emitting diode. However, in other embodiments, several emission elements could be combined in order to form either of the first and second light sources, in such a manner as to emit a light intensity with a higher optical power at the exit of the headlamp. Each emission element could, for example, be composed of a light-emitting diode or a laser diode.

The first 5 and second 6 collectors are designed to collect the light emitted by the first 3 and second 4 light sources, respectively, to collimate and to redirect the light collected in first D1 and second D2 directions which converge toward the optical axis A.

For this purpose, here, the first collector 5 comprises a collection portion 50 configured for collecting the light coming from the first light source 3. Similarly, the second collector 6 comprises a collection portion 60 configured for collecting the light coming from the second light source 4.

Each collector is designed to guide the light collected and to collimate it in a direction of collimation forming a collimation angle $\alpha_c$ with the optical axis A, whose absolute value is non-zero and, preferably, in the range between 0° and 15°.

In some variant embodiments, the value of this collimation angle could be adapted to each collector, respectively, such that the direction of collimation D5 of the first collector 5 and the direction of collimation D6 of the second collector 6 respectively form a first collimation angle $\alpha_{c5}$ and a second collimation angle $\alpha_{c6}$ with the optical axis A.

The light collected is guided to the interior of the collector and collimated after reflection on the optical interface formed by the sidewalls of the collector and the ambient air.

Each of the first 5 and second 6 optical collectors may comprise a transparent material of refractive index greater than or equal to 1.41 exhibiting properties suitable for the propagation of light, such as PMMA (poly-methyl-methacrylate) or polycarbonate PPC (polypropylene carbonate).

According to the invention, the first 3 and second 4 light sources are oriented in such a manner as to emit light in first D3 and second D4 overall directions of emission, respectively. These directions diverge from the optical axis an in the direction of propagation of the light (toward the lens 10)

and each form an angle of emission $\alpha_{e3}$ and $\alpha_{e4}$, respectively, with the optical axis A whose absolute value is in the range between 5° and 15°.

This orientation allows the spacing H vertically separating the first 3 and second 4 light sources to be minimized. This is particularly advantageous in order to reduce the vertical size of the module with respect to the conventional solutions of the prior art where the sources are oriented in such a manner as to emit the light in the direction of the optical axis A, and so as to avoid significant losses which can occur with angles greater than 15°.

The first collector 5 associated with the first light source 3 is oriented substantially in the first overall direction of emission D3 forming a first angle of emission $\alpha_{e3}$ with the optical axis A, in such a manner as to collect the maximum amount of light coming from the first light source 3. Similarly, the second collector 6 associated with the second light source 4 is oriented substantially in the second overall direction of emission D4 forming a second angle of emission $\alpha_{e4}$ with the optical axis A, in such a manner as to collect the maximum amount of light coming from the second light source 4.

In the exemplary embodiment described here, the two light sources and associated collectors are oriented symmetrically with respect to the optical axis A such that the first and second angles of emission have the same value ($\alpha_{e3}=\alpha_{e4}$) that will henceforth be denoted by $\alpha_e$, this value being preferably in the range between 5° and 15°.

However, in some variant embodiments, the two light sources and associated collectors could be oriented according to angles $\alpha_{e3}$ and $\alpha_{e4}$ with different values, where the value of these angles may be adjusted as a function of the optical properties and of the geometrical configuration specific to each collector.

According to one feature of the invention, the first 5 and second 6 collectors have, at least partially, an asymmetrical configuration with the collector 5, 6 elongated along the optical axis A. As illustrated by way of example in FIG. 1, each of the two collectors exhibits an asymmetrical stretching in the direction of a focal region and, more particularly, of a focal point F of the lens, over the part of the collector closest to the optical axis, in such a manner as to focus the light toward the optical axis A, preferably onto the focal point F.

In order to better appreciate the asymmetrical nature of the shape of the collector, a grayed area representing a symmetrical shape has been superposed onto the first collector 5 in FIG. 1.

The asymmetrical shape of the collector is provided so as to redirect the light onto the same focal point F situated along the optical axis A, near to one end of the cut-off element 8. The first and second collectors are designed to redirecting the light onto this same point focal F, notably as a function of the values of the angle of emission $\alpha_e$ and of the collimation angle $\alpha_c$.

It will be noted that the higher the value of the collimation angle $\alpha_c$, within an upper limit preferably fixed at 15°, the greater the asymmetry of the collimator, in such a manner as to redirect the light toward the focal point F of the projection lens 10.

Such an asymmetry is accompanied by Fresnel losses by internal reflection on the optical interface formed by the collimator and the air (ambient medium). These losses are higher the greater the asymmetry. Consequently, the aim is to optimize the degree of asymmetry of the collector, in such a manner as to limit the attenuation of the light beam coming from the collector.

The choice of the value of the angle of emission $\alpha_e$ and of the value of the collimation angle $\alpha_c$ is a compromise between the following points.

Firstly, the angle of emission $\alpha_e$ and the collimation angle $\alpha_c$ have values in the range, preferably, between 5° and 15° and between 0° and 15°, respectively, in such a manner that the overall direction of emission and the direction of collimation are neither parallel to the optical axis A nor directed toward the cut-off element 8 in the direction of the propagation of the light. In the case where these values are different, it will be noted that the closer the value of the angle of emission $\alpha_e$ is to that of the collimation angle $\alpha_c$, the more the collection sections 50, 60 of the collectors have the effect of collecting light.

In the limiting case where the angle of emission $\alpha_e$ has a value equal to that of the collimation angle $\alpha_c$, the overall direction of emission of the light source coincides with the direction of collimation of the collimator associated with the light source.

The smaller the value of the collimation angle $\alpha_c$, the more the direction of collimation tends to be parallel to the optical axis A. Consequently, less light will be collected by the collection area of the collector and the more likely the collector will be to collide with the cut-off element 8.

In one particular embodiment, presented by way of non-limiting example, the light sources are inclined with respect to the optical axis A, in such a manner that the value of the overall angle of emission of the light sources $\alpha_e$ is equal to 5°. The collectors are oriented and designed such that the value of the collimation angle $\alpha_c$ is non-zero but close to 0°, for example, equal to 1°. Thus, each collector starts to focus the light by bringing the light rays toward the optical axis, whilst at the same time avoiding the collimator colliding with the cut-off element 8. The asymmetrical geometry of the collector is accordingly provided in order to complete the redirection of the light toward the focal point F of the lens 10.

Each of the first and second collectors comprises an exit surface 52 forming an optical interface with the ambient air, said surface being configured for redirecting the collimated light toward the focal region and, more particularly, focusing it onto the focal point F of the projection lens 10. The passage through this optical interface allows the collimated light to exit the collector in a globally focused manner.

The geometry of the exit surface 52 of the collector is determined as a function of the overall directions of emission of light sources, in such a manner as to steer the light rays coming from the collector toward one edge of the folder 8 into the focal region and, more particularly, onto the same point focal F.

More precisely, the exit surface 52 is inclined in a direction pointing toward the optical axis A, in the direction of propagation of the light, in such a manner that the exit angle $\alpha_s$ formed between the tangent to the exit surface and the perpendicular to the direction of collimation is equal to:

$$\text{Arcsin}\left(\frac{n_{air} \cdot D_h}{n \cdot D}\right)$$

where $n_{air}$ denotes the refractive index of air, n denotes the refractive index of the transparent material forming the collimator, $D_h$ denotes the height between the point of tangency to the exit surface and the plane comprising the cut-off element and D denotes the distance between the point of tangency and the focal point F. The exit angle $\alpha_s$ is in the range, preferably, between 5° and 20°.

A reduction in the size is advantageously obtained whenever the value of the collimation angle $\alpha_c$ is greater than 0°. When the value of this angle exceeds 5°, the Fresnel losses generated by the inclination of the exit surface 52, necessary for focusing the light rays toward the focal region, become dominant.

In one particular embodiment (not shown), the module according to the invention comprises a plurality of first and second light sources respectively associated with first and second collectors and a single projection lens common to all of the first and second collectors illuminating through the lens.

Advantageously, the first and second collectors are formed as a single element on either side of the optical axis A, in such a manner as to form a monolithic structure on each side of the cut-off element 8.

The invention claimed is:

1. A module for emitting at least one light beam along an optical axis for automobile vehicles, comprising:
    a first light source and a second light source,
    a first optical collector and a second optical collector arranged symmetrically with respect to the optical axis and designed to collect the light emitted by said first and second light sources, respectively, and to redirect the light collected in convergent directions, wherein:
    at least one of said first and second light sources is oriented, in such a manner as to emit light in an overall direction of emission moving away from the optical axis; and
    the collector associated with the oriented light source has, at least partially, an asymmetrical configuration elongating the collector along the optical axis, wherein the overall direction of emission forms an angle of emission between 5 and 15 degrees with the optical axis.

2. The module according to claim 1, wherein said first and second collectors are adapted for redirecting the light onto at least one focal region.

3. The module according to claim 1, wherein said first and second collectors are adapted for redirecting the light onto the same focal region.

4. The module according to claim 1, wherein at least one of the collectors comprises a collection portion oriented in the overall direction of emission of the associated light source, in such a manner as to collect and to collimate the light coming from said light source.

5. The module according to claim 4, wherein the collector and/or collectors are designed to collimate light rays coming from said source in a direction forming a non-zero collimation angle with respect to the optical axis.

6. The module according to claim 1, wherein at least one of said first and second collectors comprises an exit surface forming an optical interface, said surface being configured for focusing the collimated light toward said focal region.

7. The module according to claim 6, wherein said exit surface is inclined in a direction of inclination forming an angle of inclination with the optical axis of the collector in a range between 5° and 20°.

8. The module according to claim 1, furthermore comprising a cut-off element configured to give a cut-off profile to the beam.

9. The module according to claim 8, wherein said cut-off element is reflecting.

10. The module according to claim 8, wherein said cut-off element is disposed along the optical axis between said first and second collectors.

11. The module according to claim 1, wherein:
    said first light source and first collector are designed to supply a first beam with a cut-off profile for an illumination of the low-beam type, and
    said second light source and said second collector are designed to supply a second beam used for an illumination of the high-beam type.

12. The module according to claim 1, wherein at least one of said first and second light sources comprises a light-emitting diode.

13. The module according to claim 1, wherein said sources of light and said collectors are disposed symmetrically with respect to the optical axis.

14. The module according claim 1, comprising a plurality of first and second light sources and a plurality of first and second collectors associated respectively with the first and second light sources, and wherein the first collectors are formed as a single element and/or the second collectors are formed as a single element with one another, respectively.

15. The module according to claim 14, furthermore comprising a projection lens common to said plurality of first and second collectors and disposed along the optical axis to project light from the collectors.

16. An emission device comprising at least one emission module according to claim 1.

17. An emission device according to claim 16, wherein said device is a front headlamp of an automobile vehicle.

18. A module for emitting at least one light beam along an optical axis for automobile vehicles, comprising:
    a first light source;
    a second light source;
    a first optical collector; and
    a second optical collector, wherein:
    each of the first and second light sources has an overall direction of emission away from the optical axis and forming a non-zero angle with respect to the optical axis,
    the first and second light sources are oriented symmetrically with respect to the optical axis, and
    the first and second optical collectors collect the light emitted by said first and second light sources, respectively, and redirect the light collected in respective first and second directions away from the optical axis and forming an angle between 0 and 15 degrees with the optical axis.

19. The module according to claim 18, wherein each of the first and second optical collectors has an asymmetrical configuration elongating the collector along the optical axis.

20. The module according to claim 18, wherein said directions form an angle of about 1 degrees with respect to the optical axis and said overall directions of emission form an angle of about 5 degrees with respect to said optical axis.

21. The module according to claim 20, wherein said directions form angles with respect to the optical axis equal to each other and said overall directions of emission form angles with respect to said optical axis equal to each other.

22. The module according to claim 18, wherein said directions form angles with respect to the optical axis equal to each other and said overall directions of emission form angles with respect to said optical axis equal to each other.

23. The module according to claim 18, wherein said directions form an angle in a range of 0 to 15 degrees with respect to the optical axis and said overall directions of emission form an angle in a range of 5 to 15 degrees with respect to said optical axis.

24. The module according to claim 18, wherein said optical collectors have an exit surface inclined to form an angle with respect to the optical axis in a range of 5 to 20 degrees.

25. The module according to claim 18, comprising:
a projection lens having a focal point F;
a cut-off element disposed between the optical collectors along the optical axis;
said optical collectors being formed of a material having a refractive index n; and
said optical collectors having an exit surface through which collected light exits;
wherein the exit surface is inclined to form an angle with respect to the optical axis defined as $$\operatorname{Arcsin}\left(\frac{n_{air} \cdot D_h}{n \cdot D}\right)$$

where $n_{air}$ denotes the refractive index of air, $D_h$ denotes the distance between a point of tangency to the exit surface and a plane comprising the cut-off element and D denotes a distance between a point of tangency of the exit surface and the focal point F.

26. The module according to claim 18, comprising:
a cut-off element disposed between the optical collectors along the optical axis.

27. The module according to claim 18, comprising:
a projection lens disposed along the optical axis to project light from the collectors.

* * * * *